United States Patent
Shi et al.

(10) Patent No.: US 10,750,543 B2
(45) Date of Patent: Aug. 18, 2020

(54) APPARATUS AND METHOD FOR DETERMINING RA-RNTI, APPARATUS AND METHOD FOR TRANSMITTING RANDOM ACCESS RESPONSE AND COMMUNICATION SYSTEM

(71) Applicant: FUJITSU LIMITED, Kawasaki-shi, Kanagawa (JP)

(72) Inventors: Yulong Shi, Beijing (CN); Lianhai Wu, Beijing (CN); Meiyi Jia, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/161,655

(22) Filed: Oct. 16, 2018

(65) Prior Publication Data
US 2019/0090282 A1    Mar. 21, 2019

Related U.S. Application Data

(63) Continuation of application No. PCT/CN2016/080517, filed on Apr. 28, 2016.

(51) Int. Cl.
*H04W 74/08* (2009.01)
*H04W 76/11* (2018.01)
(Continued)

(52) U.S. Cl.
CPC ..... *H04W 74/0833* (2013.01); *H04W 72/042* (2013.01); *H04W 76/11* (2018.02); *H04W 80/02* (2013.01); *Y02D 70/126* (2018.01)

(58) Field of Classification Search
CPC ............. H04W 74/0833; H04W 76/11; H04W 72/042; H04W 80/02
See application file for complete search history.

(56) References Cited

U.S. PATENT DOCUMENTS 10,455,620 B2 * 10/2019 Hu ...................... H04W 74/006
2014/0098761 A1 * 4/2014 Lee ...................... H04W 74/006
370/329
(Continued)

FOREIGN PATENT DOCUMENTS

CN    101212796 A    7/2008
CN    102231917 A    11/2011
(Continued)

OTHER PUBLICATIONS

International Search Report issued by the State Intellectual Property Office of the P. R. China for International Patent Application No. PCT/CN2016/080517, dated Jan. 20, 2017. English translation attached.
(Continued)

*Primary Examiner* — Hassan Kizou
*Assistant Examiner* — Deepa Belur
(74) *Attorney, Agent, or Firm* — Myers Wolin, LLC (57) ABSTRACT

An apparatus for transmitting a random access response and a communication system, configured in a base station, includes: a determining unit configured to determine a coverage enhancement level to which a user equipment (UE) transmitting a preamble belongs according to a position of a time-frequency resource of the detected preamble; a calculating unit configured to, according to a coverage enhancement level identity corresponding to the UE, calculate a random access wireless network temporary identity (RA-RNTI) used by the UE; and a transmitting unit configured to transmit a random access response (RAR) of the UE, the RAR being scrambled by the RA-RNTI of the UE.

10 Claims, 7 Drawing Sheets

101
a base station determines an coverage enhancement level to which a user equipment (UE) transmitting a preamble belongs according to a detected position of a time-frequency resource of the preamble 102
the base station caLculates a random access wireless network temporary identity (RA-RNTI) used by the UE according to a coverage enhancement level identity corresponding to the UE 103
The base station transmits a random access response (RAR) of the UE, the RAR being scrambled by the RA-RNTI of the UE (51) Int. Cl.
*H04W 72/04* (2009.01)
*H04W 80/02* (2009.01)

(56) References Cited

U.S. PATENT DOCUMENTS

| | | | |
|---|---|---|---|
| 2015/0117374 A1* | 4/2015 | Wu | H04W 74/0833 370/329 |
| 2016/0183231 A1 | 6/2016 | Shi et al. | |
| 2016/0345325 A1 | 11/2016 | Liu et al. | |
| 2017/0280483 A1* | 9/2017 | Liu | H04L 1/08 |
| 2018/0077722 A1* | 3/2018 | Awad | H04W 74/002 |
| 2019/0098667 A1* | 3/2019 | Lai | H04W 72/14 |

FOREIGN PATENT DOCUMENTS

| | | |
|---|---|---|
| CN | 104349458 A | 2/2015 |
| CN | 104518843 A | 4/2015 |
| CN | 104602359 A | 5/2015 |
| CN | 104704884 A | 6/2015 |
| CN | 104812084 A | 7/2015 |
| CN | 105430750 A | 3/2016 |

OTHER PUBLICATIONS

Second Notification of Office Action and search report issued by the China National Intellectual Property Administration for corresponding Chinese Patent Application No. 201680084401.7, dated Jun. 1, 2020, with an English translation.

\* cited by examiner

901 a base station determines a random access wireless network temporary identity (RA-RNTI) used by a user equipment (UE) according to a coverage enhancement level identity corresponding to the UE

A user equipment (UE) determines a random access wireless network temporary identity (RA-RNTI) used by itself according to a coverage enhancement level Identity corresponding to the UE

APPARATUS AND METHOD FOR DETERMINING RA-RNTI, APPARATUS AND METHOD FOR TRANSMITTING RANDOM ACCESS RESPONSE AND COMMUNICATION SYSTEM

CROSS REFERENCE TO RELATED APPLICATIONS

This application is a continuation application of International Application PCT/CN2016/080517 filed on Apr. 28, 2016, the entire contents of which are incorporated herein by reference.

FIELD

This disclosure relates to the field of communication technologies, and in particular to an apparatus and method for determining a random access radio network temporary identity (RA-RNTI), an apparatus and method for transmitting a random access response (RAR) and a communication system.

BACKGROUND

As Internet of Things (IoT) is more and more widely used in the next generation of mobile communication networks, new wireless communication technology for supporting IoT business, i.e., a subject of a technology of narrow band Internet of Things (NB-IoT), is under study in the 3rd generation partnership project (3GPP).

IoT business has many new features, including ultra-low power consumption requirement, deployment of massive user equipment (UE), relatively less flow of data, and relatively low requirement on traffic latency, etc. Such features pose many technical requirements to an LTE system, in which the most important requirement includes the ultra-low power consumption requirement on the user equipment.

The NB-IoT technology is a new narrow band communication technology based on the existing LTE technology and enhanced to satisfy IoT business demands. In an NB-IoT random access procedure, a user equipment (UE) selects a time-frequency resource used for transmitting a preamble according to configuration of the network, and calculates a random access radio network temporary identity (RA-RNTI) according to the selected resource. The network side obtains the RA-RNTI used by the UE according to a position of the resource for transmitting the preamble by the UE, and transmits a random access response (RAR) scrambled by the RA-RNTI to the UE. The UE descrambles a physical downlink control channel (PDCCH) by using the RA-RNTI, and further decodes an RAR corresponding to the UE.

In an LTE system, RA-RNTI=1+t_id+10*f_id; where, t_id denotes a subframe number selected by the UE for transmitting a preamble, and f_id denotes a position of a frequency resource selected by the UE for transmitting the preamble. RARs of multiple UEs may be multiplexed into a protocol data unit (PDU) of a media access control (MAC) layer for transmission. Multiple RARs in one MAC PDU are differentiated by sequence numbers of preambles.

In an NB-IoT system, sequence numbers of preambles used by all UEs are identical, and a random access opportunity for transmitting the preambles appears once at most 40 ms. Hence, t_id is not embodied any longer in the calculation of the RA-RNTI, while a system frame number (SFN) is used to denote a time-domain position for transmitting a preamble by the UE. And f_id is used to differentiate different RARs multiplexed in one MAC PDU. Hence, RA-RNTI=1+(SFN/4).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in the NB-IoT system, up to 48 frequency resources, that is, 48 different f_ids, may be configured for each random access opportunity. But, limited by a size of a physical channel transport block of the NB-IoT, each MAC PDU is able to accommodate up to 16 RAR data. Therefore, in a case where more than 16 UEs select different frequency resource positions to transmit preambles in the same random access opportunity, RARs fed back by the network cannot be multiplexed into one MAC PDU. These RARs need to be transmitted via multiple MAC PDUs scrambled by identical RA-RNTIs. The UE needs to receive multiple PDUs scrambled by identical RA-RNTIs after transmitting the preambles; however, only one of the multiple MAC PDUs may possibly include the RAR of the UE. In this case, the energy of the UE decoding the MAC PDU is wasted.

Embodiments of this disclosure provide an apparatus and method for determining an RA-RNTI, an apparatus and method for transmitting an RAR and a communication system, in which by improving a method for calculating an RA-RNTI, RARs scrambled by identical RA-RNTIs may be multiplexed into one MAC PDU, thereby lowering power consumption of the UE.

According to a first aspect of the embodiments of this disclosure, there is provided an apparatus for transmitting a random access response, configured in a base station, the apparatus including:

a determining unit configured to determine a coverage enhancement level to which a user equipment (UE) transmitting a preamble belongs according to a position of a time-frequency resource of the detected preamble;

a calculating unit configured to, according to a coverage enhancement level identity corresponding to the UE, calculate a random access wireless network temporary identity (RA-RNTI) used by the UE; and a transmitting unit configured to transmit a random access response (RAR) of the UE, the RAR being scrambled by the RA-RNTI of the UE.

According to a second aspect of the embodiments of this disclosure, there is provided a random access apparatus, configured in a user equipment (UE), the apparatus including:

a determining unit configured to determine a coverage enhancement level to which the UE belongs according to a measurement result;

a selecting unit configured to select a frequency resource from time-frequency resources to which the coverage enhancement level to which the UE belongs corresponds;

a transmitting unit configured to transmit a preamble by using the frequency resource selected by the selecting unit when the UE performs a random access procedure;

a calculating unit configured to calculate an RA-RNTI used by the UE according to the coverage enhancement level to which the UE belongs; and a processing unit configured to descramble a PDCCH in an RAR window according to the RA-RNTI used by the UE, and obtain an RAR of the UE according to the frequency resource used by the transmitting unit for transmitting the preamble.

According to a third aspect of the embodiments of this disclosure, there is provided a communication system, including a base station and a UE; wherein, the base station includes the apparatus for transmitting a random access response as described in the first aspect, and the UE includes the apparatus for transmitting a random access response as described in the second aspect.

According to a fourth aspect of the embodiments of this disclosure, there is provided an apparatus for determining a random access radio network temporary identity, configured in a base station, the apparatus including:

a first determining unit configured to determine a random access wireless network temporary identity (RA-RNTI) used by a UE according to a coverage enhancement level identity corresponding to the UE.

According to a fifth aspect of the embodiments of this disclosure, there is provided an apparatus for determining a random access radio network temporary identity, configured in a UE, the apparatus including:

a first determining unit configured to determine a random access wireless network temporary identity (RA-RNTI) used by a UE according to a coverage enhancement level identity corresponding to the UE.

According to a sixth aspect of the embodiments of this disclosure, there is provided a communication system, including a base station and a UE; wherein, the base station includes the apparatus for determining a random access radio network temporary identity as described in the fourth aspect, and the UE includes the apparatus for determining a random access radio network temporary identity as described in the fifth aspect.

An advantage of the embodiments of this disclosure exists in that by improving a method for calculating an RA-RNTI, RARs scrambled by identical RA-RNTIs may be multiplexed into one MAC PDU, thereby lowering power consumption of the UE.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. Such embodiments are illustrative only, and are intended to limit this disclosure.

In this disclosure, process at a network side refers to processing of a base station, except otherwise specified. The base station may also be referred to as an access point, a broadcast transmitter, a node B, or an evolution node B (eNB), etc., and may include some or all functions of them.

A term "base station" shall be used in the text, and each base station provides communication coverage for a specific geographical region.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

In the embodiments of this disclosure, a coverage enhancement level identity to which the UE belongs is introduced into a formula for calculating an RA-RNTI, which is defined as CEL_id. UEs at different coverage enhancement levels use different RA-RNTIs. And only RARs transmitted to UEs at identical coverage enhancement levels are multiplexed into one MAC PDU, thereby lowering a probability that an MAC PDU is unable to accommodate all RARs having identical RA-RNTIs. Moreover, as UEs to which these RARs correspond are in identical coverage enhancement levels, identical numbers of times of repeated transmission may be used, and it is more suitable to be multiplexed into one MAC PDU for transmission.

The embodiments of this disclosure shall be described below with reference to the accompanying drawings.

Embodiment 1

The embodiment of this disclosure provides a method for transmitting a random access response, which shall be described from a base station side.

Figure 1:
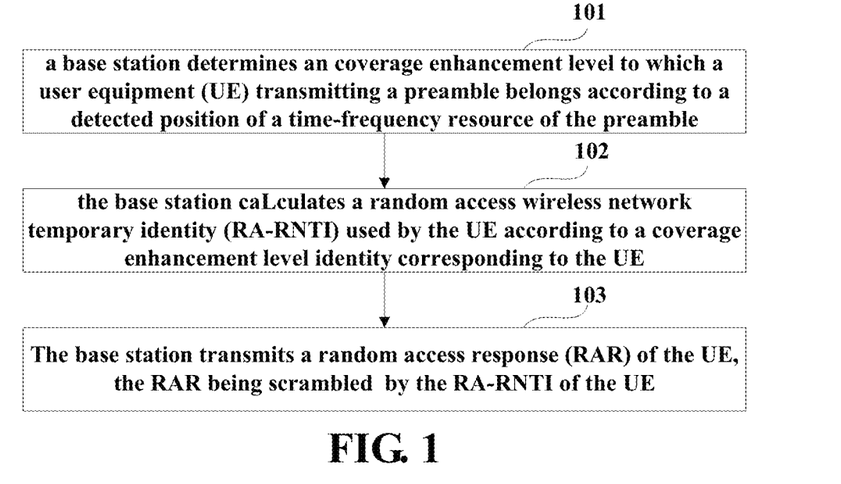
FIG. 1 is a schematic diagram of the method for transmitting a random access response of Embodiment 1.

FIG. 1 is a schematic diagram of the method for transmitting a random access response of the embodiment of this disclosure. As shown in FIG. 1, the method includes:

step 101: a base station determines a coverage enhancement level to which a user equipment (UE) transmitting a preamble belongs according to a position of a time-frequency resource of the detected preamble;

step 102: the base station calculates a random access wireless network temporary identity (RA-RNTI) used by the UE according to a coverage enhancement level identity corresponding to the UE; and step 103: the base station transmits a random access response (RAR) of the UE, the RAR being scrambled by the RA-RNTI of the UE.

In this embodiment, the UE may be, for example, a terminal of an NB-IoT system; however, this disclosure is not limited thereto. For example, the UE may also be a terminal of another network system. The embodiment of this disclosure is described by taking the NB-IoT system as an example only, but is not limited thereto, and it may be applicable to any system that performs RAR transmission.

In this embodiment, the base station may be a base station of a cell to which the UE belongs; the base station may be a macro base station (for example, an eNB), and the UE is served by a macro cell generated by the macro base station; and the base station of the embodiments of this disclosure may also be a pico base station, and the UE is served by a pico cell (or a micro cell) generated by the pico base station. The embodiment of this disclosure is not limited thereto, and a particular scenario may be determined according to an actual situation.

In this embodiment, according to distances between UEs within coverage of the base station and the base station, UEs within a range of a cell of the base station are divided into different coverage enhancement levels, and the UE may determine a coverage enhancement level to which it belongs according to its own measurement result.

In this embodiment, the coverage enhancement level identity to which the UE belongs is introduced into calculation of the RA-RNTI. Hence, RARs of UEs in identical coverage enhancement levels may be scrambled by using identical RA-RNTIs and may be multiplexed into one MAC PDU for transmission, which greatly lowers a probability that RARs having identical RA-RNTIs are unable to be multiplexed into one MAC PDU, thereby lowering power consumption of the UE.

In this embodiment, the base station may configure an available time-frequency resource position for each coverage enhancement level in the cell, and broadcast information on the available time-frequency resource position of each coverage enhancement level. Hence, the UE within the coverage range of the cell may receive the information and determine an available time-frequency resource of its own according to the coverage enhancement level to which it belongs. In this embodiment, the base station may perform the foregoing configuration in a dynamic, or static, or semi-static manner, which is not limited in this embodiment.

In this embodiment, as described above, as being limited by the size of the physical channel transport block of the NB-IoT, and each MAC PDU is able to accommodate up to 16 RAR data. Hence, in performing the above configuration, the base station makes the number of available frequency resources of each coverage enhancement level to be less than or equal to 16 as possible, so as to ensure that up to 16 RAR data are multiplexed into one MAC PDU for transmission.

In this embodiment, as the base station configures an available time-frequency resource position for each coverage enhancement level in the cell, the UE selects a time-frequency resource from the available frequency resources to which the coverage enhancement level to which it belongs corresponds for transmitting a preamble. Hence, after receiving the preamble transmitted by the UE, the base station may determine a time-frequency resource position of the preamble, further determine the coverage enhancement level to which the UE belongs, and calculate the RA-RNTI used by the UE according to the coverage enhancement level identity corresponding to the UE. It can be seen that since the coverage enhancement level identity corresponding to the UE is introduced into the calculation of the RA-RNTI, the RA-RNTIs used by the UEs in the identical coverage enhancement level are identical in each random access opportunity.

In one implementation, the base station may calculate the RA-RNTI used by the UE according to the coverage enhancement level identity corresponding to the UE and the time domain resource used by the UE in transmitting the preamble. In this implementation, in each time of random access, the time domain resources (such as the system frame numbers) used by the UEs for transmitting the preambles are identical, and this embodiment is not limited thereto. And in other implementations, the base station may also calculate the RA-RNTI used by the UE based on the coverage enhancement level identity corresponding to the UE and other parameters, or the base station may calculate the RA-RNTI used by the UE based only on the coverage enhancement level identity corresponding to the UE, only if the coverage enhancement level identity corresponding to the UE is introduced in the process of calculation of the RA-RNTI, so that the RARs of the UEs in identical coverage enhancement levels can be multiplexed into one MAC PDU for transmission.

In one implementation, the calculation formula of the RA-RNTI can be expressed as: RA-RNTI=1+CEL_id+N*(SFN/4); where, CEL_id is the coverage enhancement level identity corresponding to the UE, which may be denoted as 0, 1, 2, 3, . . . , or may be denoted as other values, N is a total number of the coverage enhancement levels, N≥1, such as 4, and SFN is a system frame number, which is the time-domain resource used by the UE for transmitting the preamble.

In another implementation, other parameters, such as a hyper system frame number (HSFN), may be taken into account in the calculation of the RA-RNTI. However, this embodiment is not limited thereto, and all are covered by the protection scope of this disclosure only if a coverage enhancement level identity is introduced into calculation of an RA-RNTI, and UEs in identical coverage enhancement levels may possibly use identical RA-RNTIs, so that the RARs of the UEs can be multiplexed into one MAC PDU.

In this embodiment, as described above, as RA-RNTIs used by the UEs in identical coverage enhancement levels are identical, the base station may multiplex the RARs of the UEs in identical coverage enhancement levels into one MAC PDU for transmission by using the RA-RNTIs used by the UEs in identical coverage enhancement levels. Reference may be made to the related art for a particular multiplexing manner, which shall not be described herein any further.

In this embodiment, as the UEs to which the RARs multiplexed into one MAC PDU correspond are in identical coverage enhancement levels, data of these UEs may use identical numbers of times of repeated transmission. Hence, the RARs of these UEs are more suitable for being multiplexed into one MAC PDU for transmission, thereby further saving the power consumption of the UEs.

It can be seen from the above embodiment that after the identities of the coverage enhancement levels of the UEs are introduced into the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 2

The embodiment of this disclosure provides a random access method, which shall be described from a UE side, with contents identical to those in Embodiment 1 being not going to be described herein any further.

Figure 2:
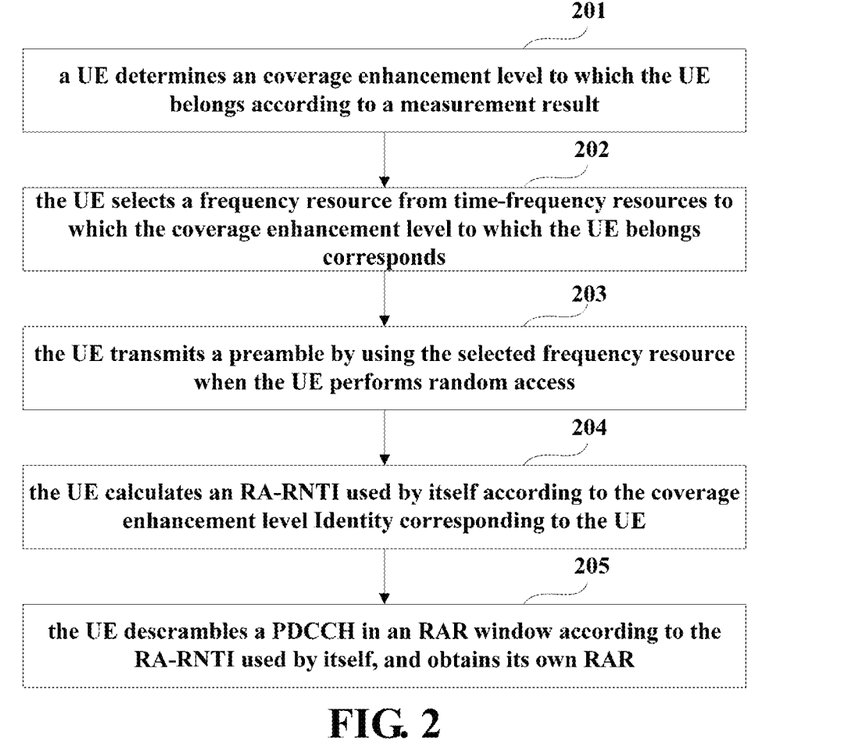
FIG. 2 is a schematic diagram of the random access method of Embodiment 2.

FIG. 2 is a schematic diagram of the random access method of the embodiment of this disclosure. As shown in FIG. 2, the method includes:

step 201: a UE determines a coverage enhancement level to which the UE belongs according to a measurement result;

step 202: the UE selects a frequency resource from time-frequency resources to which the coverage enhancement level to which the UE belongs corresponds;

step 203: the UE transmits a preamble by using the selected frequency resource when the UE performs random access;

step 204: the UE calculates an RA-RNTI used by itself according to the coverage enhancement level to which it belongs; and step 205: the UE descrambles a PDCCH in an RAR window according to the RA-RNTI used by itself, and obtains an RAR of itself according to the frequency resource used for transmitting the preamble.

In this embodiment, as described above, a coverage enhancement level identity corresponding to the UE is introduced into the calculation of the RA-RNTI, and as RARs of UEs in identical coverage enhancement levels are multiplexed into one MAC PDU for transmission, the UEs may obtain the RARs of themselves according to the RA-RNTIs used by themselves without needing to decode multiple MAC PDUs, thereby lowering the power consumption of the UEs.

In this embodiment, the above measurement result may be a measurement result of a signal strength, or may be a measurement result of signal quality. This embodiment is not limited thereto, and the UE may determine the coverage enhancement level to which it belongs according to the measurement result.

In this embodiment, as described above, the base station configures available time-frequency resources of coverage enhancement levels in a cell for the UE, and after determining the coverage enhancement level to which it belongs, the UE may select a frequency resource for transmitting a preamble from the time-frequency resources to which the coverage enhancement level to which it belongs corresponds, so as to transmit the preamble by using the selected frequency resource in performing random access.

In this embodiment, the UE may calculate the RA-RNTI used by itself according to the coverage enhancement level identity corresponding to the UE (i.e. CEL_id) and the time domain resource (such as a system frame number) used for transmitting the preamble. However, as described above, this embodiment is not limited thereto.

In one embodiment, as described above, the calculation formula for the RA-RNTI is:

$$RA\text{-}RNTI=1+CEL\_id+N*(SFN/4);$$

where, CEL_id is the coverage enhancement level identity corresponding to the UE, N is a total number of the coverage enhancement levels, N≥1, and SFN is a system frame number.

The above formula for calculating the RA-RNTI is an example only. However, this embodiment is not limited thereto, and as described above, in other implementations, other parameters may be taken into account in the calculation of the RA-RNTI, only if the calculation of the RA-RNTI may make the RA-RNTIs used by the UEs belonging to identical coverage enhancement levels are identical.

In this embodiment, the UE may descramble a PDCCH by using the calculated RA-RNTI in an RAR window to obtain a PDSCH where the MAC PDU is located, and decode the MAC PDU according to the frequency resource (i.e. f_id) used for transmitting the preamble to obtain an RAR fed back by the network to itself.

The random access method of this embodiment shall be described below with reference to interaction between the base station and the UE.

Figure 3:
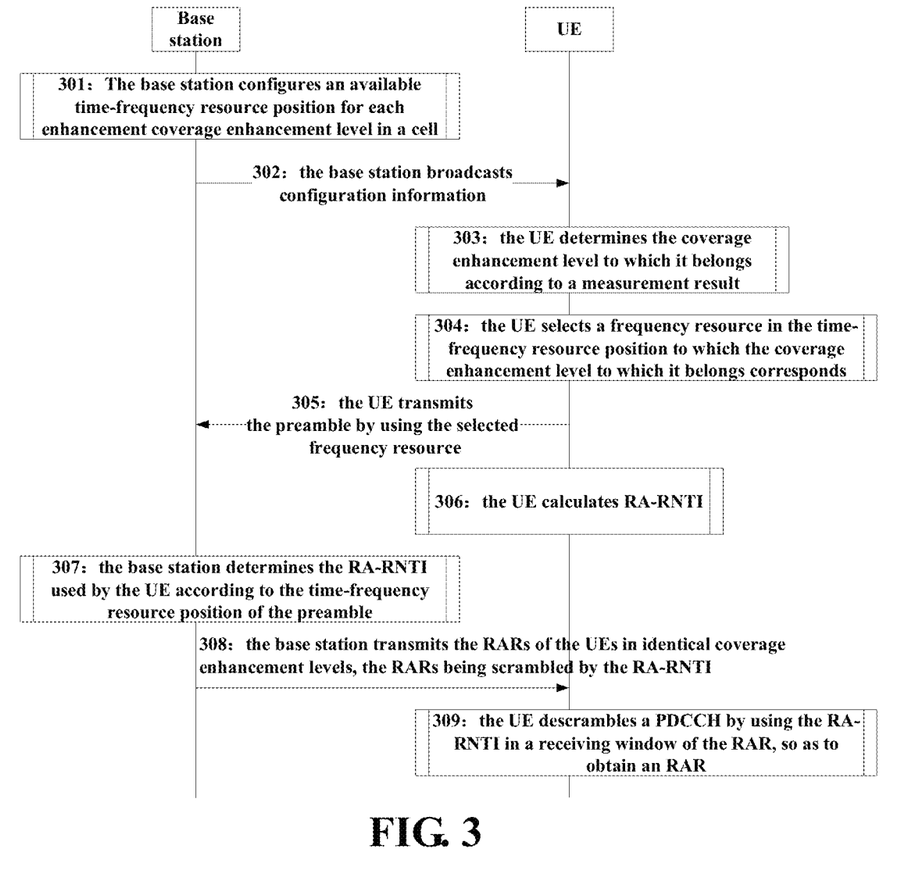
FIG. 3 is a schematic diagram of interaction between a base station and a UE.

FIG. 3 is a schematic diagram of interaction between the base station and the UE according to the method of this embodiment. As shown in FIG. 3, the method includes:

step 301: the base station configures an available time-frequency resource position for each enhancement coverage enhancement level in a cell;

step 302: the base station broadcasts configuration information on available time-frequency resource positions of coverage enhancement levels;

step 303: the UE determines the coverage enhancement level to which it belongs according to a measurement result;

step 304: the UE selects a frequency resource used for transmitting a preamble in the time-frequency resource position to which the coverage enhancement level to which the UE belongs corresponds;

step 305: the UE transmits the preamble by using the selected frequency resource in performing random access;

step 306: the UE calculates RA-RNTI of itself;

wherein, the UE may calculate the RA-RNTI according to the coverage enhancement level identity corresponding to the UE, such as calculating the RA-RNTI according to the coverage enhancement level identity corresponding to the UE and the time domain resource (a system frame number) used for transmitting the preamble, and a particular method of calculation is as described above;

step 307: the base station determines the RA-RNTI used by the UE according to the detected time-frequency resource position of the preamble;

wherein, after receiving the preamble, the base station may determine the time-frequency resource position of the preamble, such as the time domain resource (system frame number), and the frequency resource, etc., used for transmitting the preamble; as the base station configures different coverage enhancement levels with different available time-frequency resources, the base station may determine the coverage enhancement level to which the UE transmitting the preamble belongs according to the detected time-frequency resources position of the preamble, and thereby calculate the RA-RNTI used by the UE by using the same manner as the UE;

step 308: the base station transmits the RARs of the UEs in identical coverage enhancement levels, the RARs being scrambled by the RA-RNTI;

wherein, for UEs in identical coverage enhancement levels, as the RA-RNTIs used by these UEs are identical, the base station may multiplex the RARs of these UEs into one MAC PDU, and, by using the identical RA-RNTIs used by these UEs, scramble the MAC PDU for transmission, and reference may be made to the related art for a particular manner of scrambling and transmitting;

step 309: the UE descrambles a PDCCH by using the RA-RNTI of itself in an RAR window, so as to obtain an RAR fed back by the network to it;

for example, the UE descramble the PDCCH by using its own RA-RNTI, obtains a position of a PDSCH where the MAC PDU is located, obtains the MAC PDU from the position, and obtains the RAR of itself by decoding the MAC PDU according to the frequency position for transmitting the preamble.

The random access method of this embodiment is described above through the interaction process of FIG. 3. An order of execution of the steps in FIG. 3 is not limited in this embodiment; for example, step 306 and step 307 may be performed sequentially or in parallel. In addition, in a particular implementation process, such as in a random access procedure, some steps may be added, or some steps may be reduced or combined.

It can be seen from the above embodiment that after the identities of the coverage enhancement levels of the UEs are introduced into the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 3

The embodiment of this disclosure provides an apparatus for transmitting a random access response, which may be configured in a base station. The embodiment of this disclosure corresponds to the method of Embodiment 1, with identical contents being not going to be described herein any further.

Figure 4:
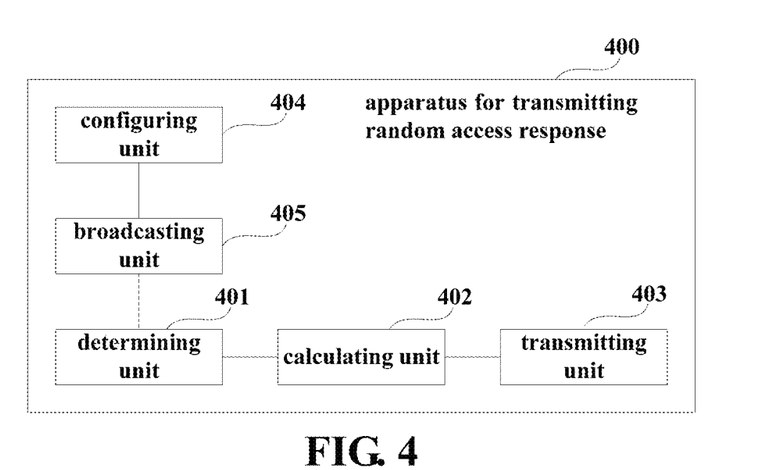
FIG. 4 is a schematic diagram of the apparatus for transmitting a random access response of Embodiment 3.

FIG. 4 is a schematic diagram of the apparatus for transmitting a random access response of the embodiment of this disclosure. As shown in FIG. 4, an apparatus 400 for transmitting a random access response includes:

a determining unit 401 configured to determine a coverage enhancement level to which a user equipment (UE) transmitting a preamble belongs according to a position of a detected time-frequency resource of the preamble;

a calculating unit 402 configured to, according to a coverage enhancement level identity corresponding to the UE, calculate a random access wireless network temporary identity (RA-RNTI) used by the UE; and a transmitting unit 403 configured to transmit a random access response (RAR) of the UE, the RAR being scrambled by the RA-RNTI of the UE.

As shown in FIG. 4, the apparatus 400 for transmitting a random access response may further include:

a configuring unit 404 configured to configure each coverage enhancement level in a cell with positions of available time-frequency resources; and a broadcasting unit 405 configured to broadcast configuration information on the positions of the available time-frequency resources of the coverage enhancement level.

In this embodiment, the broadcasting unit 405 and the transmitting unit 403 may be combined into one module.

In this embodiment, RA-RNTIs used by UEs in different coverage enhancement levels are different, and the transmitting unit 403 may multiplex random access responses (RARs) of the UEs in identical coverage enhancement levels to one medium access control protocol data unit (MAC PDU) for transmission by using RA-RNTIs used by UEs in identical coverage enhancement levels.

In this embodiment, the calculating unit 402 may calculate the RA-RNTI used by the UE according to the coverage enhancement level identity corresponding to the UE and a time-domain resource used by the UE for transmitting the preamble. However, as described above, this embodiment is not limited thereto.

In one implementation, the calculating unit 402 may calculate the RA-RNTI used by the UE by using a formula below:

$$RA\text{-}RNTI = 1 + CEL\_id + N*(SFN/4);$$

where, CEL_id is the coverage enhancement level identity corresponding to the UE, N is a total number of the coverage enhancement levels, N≥1, and SFN is a system frame number used by the UE for transmitting the preamble.

It can be seen from the above embodiment that after the identities of the coverage enhancement levels of the UEs are introduced into the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 4

The embodiment of this disclosure provides a random access apparatus, which may be configured in a UE. The embodiment of this disclosure corresponds to the method of Embodiment 2, with identical contents being not going to be described herein any further.

Figure 5:
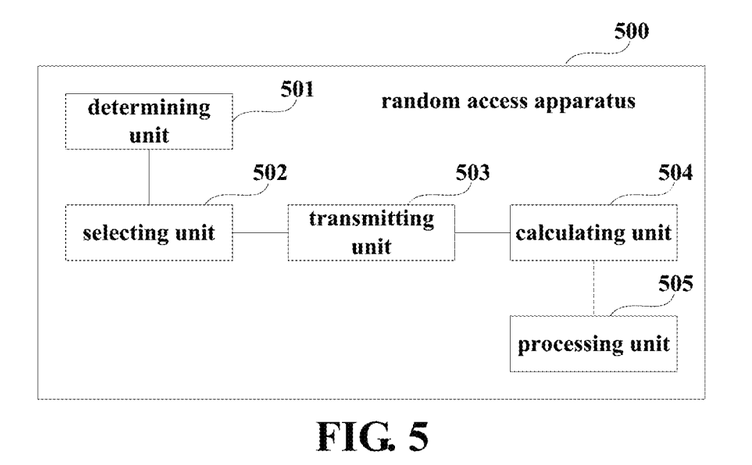
FIG. 5 is a schematic diagram of the apparatus for transmitting a random access response of Embodiment 4.

FIG. 5 is a schematic diagram of the random access apparatus of the embodiment of this disclosure. As shown in FIG. 5, a random access apparatus 500 includes:

a determining unit 501 configured to determine a coverage enhancement level to which the UE belongs according to a measurement result;

a selecting unit 502 configured to select a frequency resource for transmitting preamble from time-frequency resources to which the coverage enhancement level to which the UE belongs corresponds;

a transmitting unit 503 configured to transmit a preamble by using the selected frequency resource in performing random access;

a calculating unit 504 configured to calculate an RA-RNTI used by the UE according to the coverage enhancement level to which the UE belongs; and a processing unit 505 configured to descramble a PDCCH of the UE in an RAR window according to the RA-RNTI used by the UE, and obtain an RAR of the UE according to the frequency resource used by the transmitting unit 503 for transmitting the preamble.

In this embodiment, the calculating unit 504 may calculate the RA-RNTI used by the UE according to the coverage enhancement level identity corresponding to the UE and a time-domain resource used by the transmitting unit 503 for transmitting the preamble. However, as described above, this embodiment is not limited thereto.

In one implementation, the calculating unit 504 may calculate the RA-RNTI used by the UE by using a formula below:

$$RA\text{-}RNTI = 1 + CEL\_id + N*(SFN/4);$$

where, CEL_id is the coverage enhancement level identity corresponding to the UE, N is a total number of the coverage enhancement levels, N≥1, and SFN is a system frame number (a time-domain resource) used by the transmitting unit 503 for transmitting the preamble.

In this embodiment, after the processing unit 505 descrambles the PDCCH, it may obtain a PDSCH where its MAC PDU is located, hence may obtain the MAC PDU, and obtain the RAR fed back by the network side to it by decoding the MAC PDU by using the above frequency resource.

It can be seen from the above embodiment that after the identities of the coverage enhancement levels of the UEs are introduced into the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 5

The embodiment of this disclosure provides a communication system, with contents identical to those in embodiments 1-4 being not going to be described herein any further.

Figure 6:
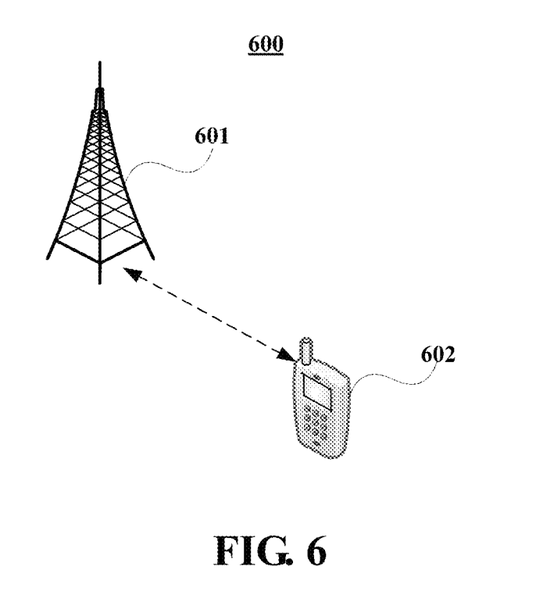
FIG. 6 is a schematic diagram of the communication system of Embodiment 5.

FIG. 6 is a schematic diagram of the communication system of the embodiment of this disclosure. As shown in FIG. 6, a communication system 600 includes a base station 601 and a UE 602. The base station 601 may be configured with the apparatus 400 for transmitting a random access response as described in Embodiment 3, and the UE 602 may be configured with the random access apparatus 500 as described in Embodiment 4.

The embodiment of this disclosure further provides a base station.

Figure 7:
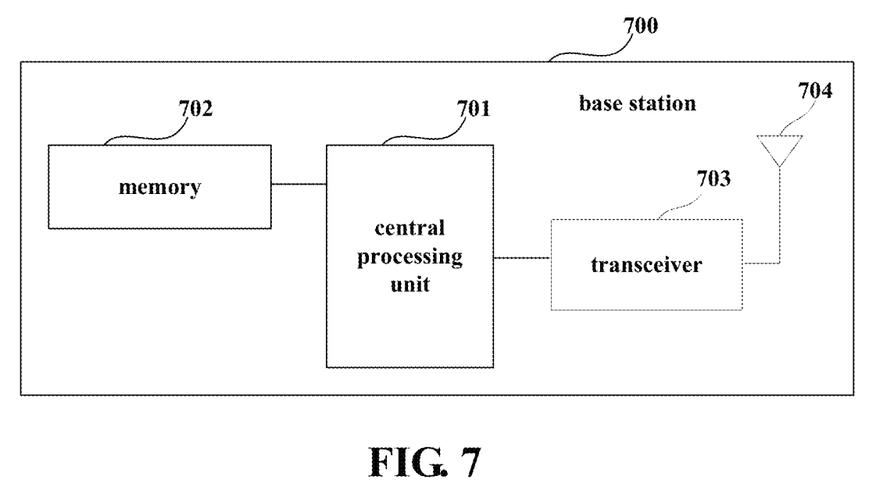
FIG. 7 is a schematic diagram of the base station of Embodiment 5.

FIG. 7 is a schematic diagram of the base station of the embodiment of this disclosure. As shown in FIG. 7, a base station 700 may include a central processing unit (CPU) 701 and a memory 702, the memory 702 being coupled to the central processing unit 701. The memory 702 may store various data, and furthermore, it may store a program for information processing, and execute the program under control of the central processing unit 701, so as to receive various information transmitted by a UE, and transmit request information to the UE.

In one implementation, the functions of the apparatus 400 for transmitting a random access response may be integrated into the central processing unit 701. The central processing unit 701 may be configured to carry out the method for transmitting a random access response described in Embodiment 1.

For example, the central processing unit 701 may be configured to perform following control: determining a coverage enhancement level to which a user equipment (UE) transmitting a preamble belongs according to a position of a time-frequency resource of the detected preamble; according to a coverage enhancement level identity corresponding to the UE, calculating a random access wireless network temporary identity (RA-RNTI) used by the UE; and transmitting a random access response (RAR) of the UE, the RAR being scrambled by the RA-RNTI of the UE.

In another implementation, the apparatus 400 for transmitting a random access response and the central processing unit 701 may be configured separately. For example, the apparatus 400 for transmitting a random access response may be configured as a chip connected to the central processing unit 701, with its functions being carried out under control of the central processing unit 701.

Furthermore, as shown in FIG. 7, the base station 700 may include a transceiver 703, and an antenna 704, etc. Functions of the above components are similar to those in the related art, and shall not be described herein any further. It should be noted that the base station 700 does not necessarily include all the parts shown in FIG. 7, and furthermore, the base station 700 may include parts not shown in FIG. 7, and the related art may be referred to.

The embodiment of this disclosure further provides a UE.

Figure 8:
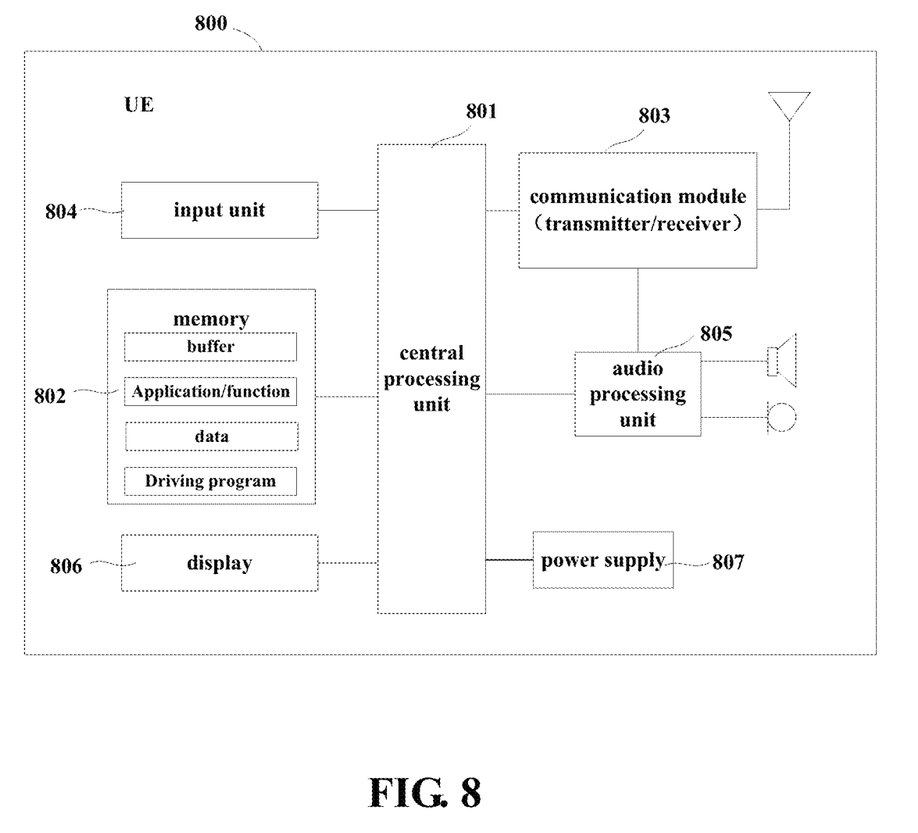
FIG. 8 is a schematic diagram of the UE of Embodiment 5.

FIG. 8 is a schematic diagram of a structure of a UE 800 of the embodiment of this disclosure. As shown in FIG. 8, the UE 800 may include a central processing unit 801 and a memory 802, the memory 802 being coupled to the central processing unit 801. It should be noted that this figure is illustrative only, and other types of structures may also be used, so as to supplement or replace this structure and achieve a telecommunications function or other functions.

As shown in FIG. 8, the central processing unit 801 is sometimes referred to as a controller or control, which may include a microprocessor or other processor devices and/or logic devices, and the central processing unit 801 receives input and controls operations of every component of the UE 800.

In the embodiment, the central processing unit 801 may be configured to carry out the random access method described in Embodiment 2. For example, the central processing unit 801 may be configured to perform the following control: determining a coverage enhancement level to which a UE belongs according to a measurement result; selecting a frequency resource from time-frequency resources to which the coverage enhancement level to which the UE belongs corresponds; transmitting a preamble by using the selected frequency resource in performing random access; calculating an RA-RNTI used by the UE according to a coverage enhancement level identity corresponding to the UE; and descrambling a PDCCH of the UE in an RAR window according to the RA-RNTI used by the UE, and obtaining an RAR of the UE according to the frequency resource used for transmitting the preamble.

As shown in FIG. 8, the UE 800 may further include a communication module 803, an input unit 804, an audio processing unit 805, a display 806, and a power supply 807. It should be noted that the UE 800 does not necessarily include all the parts shown in FIG. 8, and furthermore, the UE 800 may include parts not shown in FIG. 8, and the related art may be referred to.

An embodiment of the present disclosure provides a computer readable program, which, when executed in a base station, will cause the base station to carry out the method for transmitting a random access response described in Embodiment 1.

An embodiment of the present disclosure provides a computer storage medium, including a computer readable program, which will cause a base station to carry out the method for transmitting a random access response described in Embodiment 1.

An embodiment of the present disclosure provides a computer readable program, which, when executed in a UE, will cause the UE to carry out the method for transmitting a random access response described in Embodiment 2.

An embodiment of the present disclosure provides a computer storage medium, including a computer readable program, which will cause a UE to carry out the method for transmitting a random access response described in Embodiment 2.

Embodiment 6

The embodiment of this disclosure provides a method for determining a random access radio network temporary identity, which shall be described from a base station side, with contents identical to those in Embodiment 1 being not going to be described herein any further.

Figure 9:
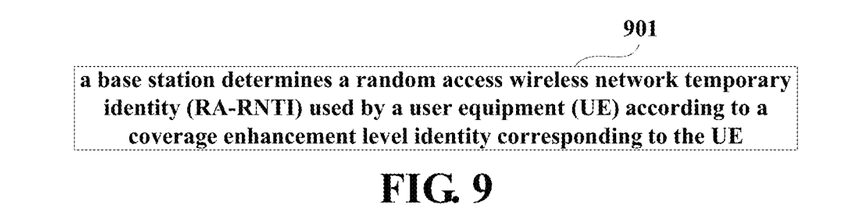
FIG. 9 is a schematic diagram of the method for determining an RA-RNTI of Embodiment 6.

FIG. 9 is a schematic diagram of the method. As shown in FIG. 9, the method includes:

step 901: a base station determines a random access wireless network temporary identity (RA-RNTI) used by a user equipment (UE) according to a coverage enhancement level identity corresponding to the UE.

In this embodiment, definitions of the base station, the UE and the coverage enhancement level are identical to those in Embodiment 1, which shall not be described herein any further.

In this embodiment, the base station may further configure an available time-frequency resource position for each coverage enhancement level in a cell, so as to determine the coverage enhancement level to which the UE belongs according to a received preamble transmitted by the UE. And a particular configuration manner is identical to that in Embodiment 1, which shall not be described herein any further.

In this embodiment, the base station may calculate the RA-RNTI used by the UE according to the coverage enhancement level identity corresponding to the UE and a time domain resource of the UE for transmitting a preamble, such as by using the calculation formula in Embodiment 1. However, as described above, this embodiment is not limited thereto.

In this embodiment, as RA-RNTIs used by UEs in identical coverage enhancement levels are identical, the base station may multiplex RARs of the UEs in identical coverage enhancement levels into one MAC PDU for transmission after determining the RA-RNTIs used by the UEs.

In this embodiment, by introducing the identities of the coverage enhancement levels to which the UEs belong into the calculation of the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 7

The embodiment of this disclosure provides a method for determining a random access radio network temporary identity, which shall be described from a UE side, with contents identical to those in Embodiment 1 or Embodiment 2 being not going to be described herein any further.

Figure 10:
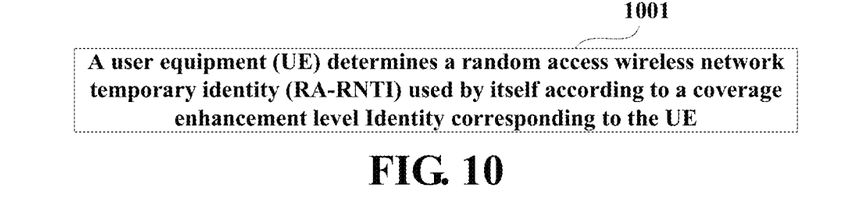
FIG. 10 is a schematic diagram of the method for determining an RA-RNTI of Embodiment 7.

FIG. 10 is a schematic diagram of the method. As shown in FIG. 10, the method includes:

step 1001: a user equipment (UE) determines a random access wireless network temporary identity (RA-RNTI) used by itself according to a coverage enhancement level identity corresponding to the UE.

In this embodiment, definitions of a base station, the UE and the coverage enhancement level are identical to those in Embodiment 1, which shall not be described herein any further.

In this embodiment, the UE may further receive configuration information broadcasted by the base station, so as to determine available time-frequency resources to which coverage enhancement levels correspond.

In this embodiment, the UE may determine the coverage enhancement level to which it belongs according to a measurement result of itself, and select a frequency resource for transmitting a preamble from the time-frequency resources to which the coverage enhancement levels correspond.

In this embodiment, the UE may calculate the RA-RNTI used by it according to the coverage enhancement level identity corresponding to the UE and the time domain resource for transmitting the preamble, such as by using the calculation formula in Embodiment 2. However, as described above, this embodiment is not limited thereto.

In this embodiment, after determining the RA-RNTI used by itself, the UE may descramble a PDCCH by using the RA-RNTI in an RAR window to obtain a position of a PDSCH where MAC PDU is located, and after the MAC PDU is obtained, the UE may obtain an RAR of itself by decoding the MAC PDU by using the frequency resource for transmitting the preamble.

In this embodiment, by introducing the identities of the coverage enhancement levels to which the UEs belong into the calculation of the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 8

The embodiment of this disclosure provides an apparatus for determining a random access radio network temporary identity, which may be configured in a base station, with contents identical to those in Embodiment 1 and Embodiment 6 being not going to be described herein any further.

Figure 11:
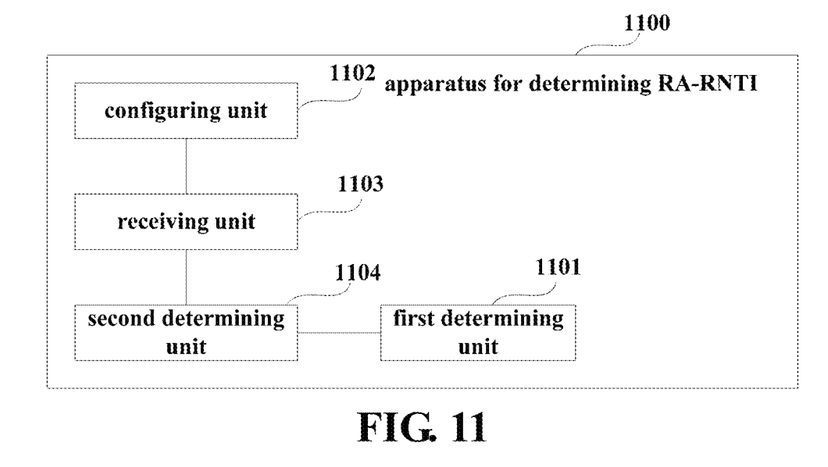
FIG. 11 is a schematic diagram of the apparatus for determining an RA-RNTI of Embodiment 8.

FIG. 11 is a schematic diagram of the apparatus. Referring to FIG. 11, an apparatus 1100 includes:

a first determining unit 1101 configured to determine a random access wireless network temporary identity (RA-RNTI) used by a user equipment (UE) according to a coverage enhancement level identity corresponding to the UE.

In this embodiment, definitions of the base station, the UE and the coverage enhancement level are identical to those in Embodiment 1, which shall not be described herein any further.

In this embodiment, as shown in FIG. 11, the apparatus 1100 may further include: a configuring unit 1102 configured to configure each coverage enhancement level in a cell with an available time-frequency resource position. And a particular configuration manner is identical to that in Embodiment 1, which shall not be described herein any further.

In this embodiment, as shown in FIG. 11, the apparatus 1100 may further include: a receiving unit 1103 configured to receive a preamble transmitted by the UE and a second determining unit 1104 configured to determine the coverage enhancement level to which the UE belongs according to the received preamble transmitted by the UE. Furthermore, the second determining unit 1104 may determine a time-frequency resource of the preamble according to the received preamble transmitted by the UE.

In this embodiment, the first determining unit 1101 may calculate the RA-RNTI used by the UE according to the coverage enhancement level identity corresponding to the UE and the time domain resource of the UE for transmitting the preamble, such as by using the calculation formula in Embodiment 1. However, as described above, this embodiment is not limited thereto.

In this embodiment, as RA-RNTIs used by UEs in identical coverage enhancement levels are identical, the base station may multiplex RARs of the UEs in identical coverage enhancement levels into one MAC PDU for transmission after determining the RA-RNTIs used by the UEs.

In this embodiment, by introducing the identities of the coverage enhancement levels to which the UEs belong into the calculation of the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 9

The embodiment of this disclosure provides an apparatus for determining a random access radio network temporary identity, configured in a UE, with contents identical to those in Embodiment 1 or Embodiment 2 or Embodiment 7 being not going to be described herein any further.

Figure 12:
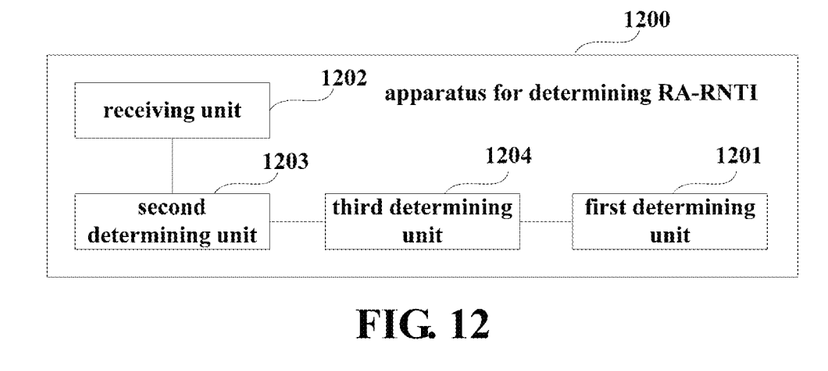
FIG. 12 is a schematic diagram of the apparatus for determining an RA-RNTI of Embodiment 9.

FIG. 12 is a schematic diagram of the apparatus. Referring to FIG. 12, an apparatus 1200 includes:

a first determining unit 1201 configured to determine a random access wireless network temporary identity (RA-RNTI) used by the UE according to a coverage enhancement level identity corresponding to the UE.

In this embodiment, definitions of a base station, the UE and the coverage enhancement level are identical to those in Embodiment 1, which shall not be described herein any further.

In this embodiment, as shown in FIG. 12, the apparatus 1200 may further include:

a receiving unit 1202 configured to receive configuration information broadcasted by the base station; and a second determining unit 1203 configured to determine available time-frequency resources to which coverage enhancement levels correspond according to the configuration information.

In this embodiment, as shown in FIG. 12, the apparatus 1200 may further include:

a third determining unit 1204 configured to determine the coverage enhancement level to which the UE belongs according to a measurement result of the UE.

In this embodiment, the UE may select a frequency resource for transmitting a preamble from the time-frequency resources to which the coverage enhancement levels correspond.

In this embodiment, the first determining unit 1201 may calculate the RA-RNTI used by the UE according to the coverage enhancement level identity corresponding to the UE and the time domain resource of the UE for transmitting the preamble, such as by using the calculation formula as described in Embodiment 2. However, as described above, this embodiment is not limited thereto.

In this embodiment, after determining the RA-RNTI used by itself, the UE may descramble a PDCCH by using the RA-RNTI in an RAR window to obtain a position of a PDSCH where MAC PDU is located, and after the MAC PDU is obtained, the UE may obtain an RAR of itself by decoding the MAC PDU by using the frequency resource for transmitting the preamble.

In this embodiment, by introducing the identities of the coverage enhancement levels to which the UEs belong into the calculation of the RA-RNTIs, a probability that RARs having identical RA-RNTIs are unable to be multiplexed into one MAC PDU may be greatly lowered, and the data having identical number of transmission repetition for coverage enhancement level are multiplexed into one MAC PDU for transmission, thereby efficiently saving the power consumption of the UE.

Embodiment 10

The embodiment of this disclosure provides a communication system, with contents identical to those in embodiments 6-9 being not going to be described herein any further.

Figure 13:
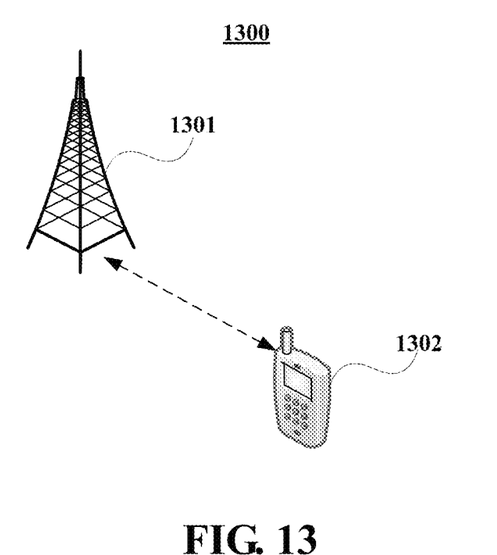
FIG. 13 is a schematic diagram of the communication system of Embodiment 10.

FIG. 13 is a schematic diagram of the communication system of the embodiment of this disclosure. As shown in FIG. 13, a communication system 1300 includes a base station 1301 and a UE 1302. The base station 1301 may be configured with the apparatus 1000 for determining an RA-RNTI as described in Embodiment 7, and the UE 1302 may be configured with the apparatus 1200 for determining an RA-RNTI as described in Embodiment 9.

The embodiment of this disclosure further provides a base station.

Figure 14:
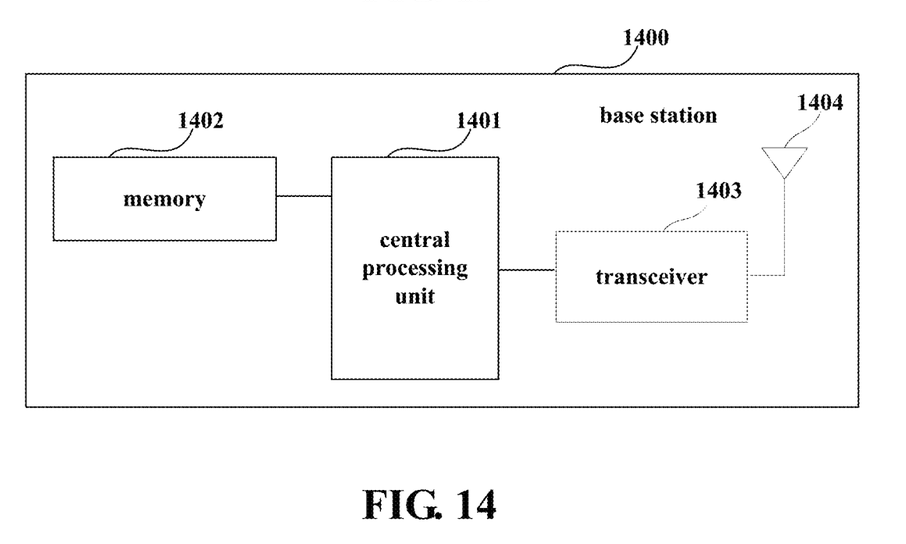
FIG. 14 is a schematic diagram of the base station of Embodiment 10.

FIG. 14 is a schematic diagram of a structure of the base station of the embodiment of this disclosure. As shown in FIG. 14, a base station 1400 may include a central processing unit (CPU) 1401 and a memory 1402, the memory 1402 being coupled to the central processing unit 1401. The memory 1402 may store various data, and furthermore, it may store a program for information processing, and execute the program under control of the central processing unit 1401, so as to receive various information transmitted by a UE, and transmit request information to the UE.

In one implementation, the functions of the apparatus 1000 for determining an RA-RNTI may be integrated into the central processing unit 1401. The central processing unit 1401 may be configured to carry out the method for determining an RA-RNTI described in Embodiment 6.

For example, the central processing unit 1401 may be configured to perform following control: determining a random access wireless network temporary identity (RA-RNTI) used by a user equipment (UE) according to a coverage enhancement level identity corresponding to the UE.

In another implementation, the apparatus 1000 for determining an RA-RNTI and the central processing unit 1401 may be configured separately. For example, the apparatus 1000 for determining an RA-RNTI may be configured as a chip connected to the central processing unit 1401, with its functions being carried out under control of the central processing unit 1401.

Furthermore, as shown in FIG. 14, the base station 1400 may include a transceiver 1403, and an antenna 1404, etc. Functions of the above components are similar to those in the related art, and shall not be described herein any further. It should be noted that the base station 1400 does not necessarily include all the parts shown in FIG. 14, and furthermore, the base station 1400 may include parts not shown in FIG. 14, and the related art may be referred to.

The embodiment of this disclosure further provides a UE.

Figure 15:
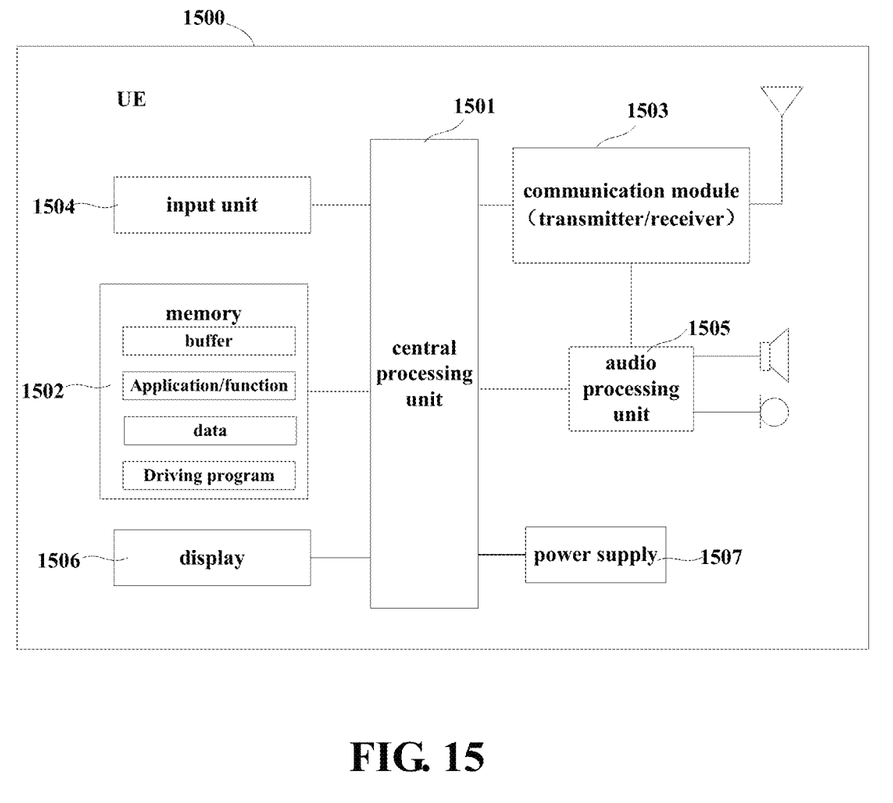
FIG. 15 is a schematic diagram of the UE of Embodiment 11.

FIG. 15 is a schematic diagram of a systematic structure of a UE 1500 of the embodiment of this disclosure. As shown in FIG. 15, the UE 1500 may include a central processing unit 1501 and a memory 1502, the memory 1502 being coupled to the central processing unit 1501. It should be noted that this figure is illustrative only, and other types of structures may also be used, so as to supplement or replace this structure and achieve a telecommunications function or other functions.

As shown in FIG. 15, the central processing unit 1501 is sometimes referred to as a controller or control, which may include a microprocessor or other processor devices and/or logic devices, and the central processing unit 1501 receives input and controls operations of every component of the UE 1500.

In the embodiment, the central processing unit 1501 may be configured to carry out the method for determining an RA-RNTI described in Embodiment 8. For example, the central processing unit 1501 may be configured to perform the following control: determining a random access wireless network temporary identity (RA-RNTI) used by a user equipment (UE) according to a coverage enhancement level identity corresponding to the UE.

As shown in FIG. 15, the UE 1500 may further include a communication module 1503, an input unit 1504, an audio processing unit 1505, a display 1506, and a power supply 1507. It should be noted that the UE 1500 does not necessarily include all the parts shown in FIG. 15, and furthermore, the UE 1500 may include parts not shown in FIG. 15, and the related art may be referred to.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 4 or 5 or 10 or 12 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1

A method for determining a random access radio network temporary identity, including:
determining a random access wireless network temporary identity (RA-RNTI) used by a user equipment (UE) by a base station according to a coverage enhancement level identity corresponding to the UE.

Supplement 2

The method according to supplement 1, wherein the method further includes:
configuring an available time-frequency resource position for each coverage enhancement level in a cell by the base station; and broadcasting configuration information on positions of the available time-frequency resources of coverage enhancement levels by the base station.

Supplement 3

The method according to supplement 1, wherein the method further includes:
determining the coverage enhancement level to which the UE belongs by the base station according to a received preamble transmitted by the UE.

Supplement 4

The method according to supplement 1, wherein the base station calculates the RA-RNTI used by the UE according to the coverage enhancement level identity corresponding to the UE and the time domain resource of the UE for transmitting the preamble.

Supplement 5

The method according to supplement 1, wherein the base station calculates the RA-RNTI according to a formula below:

$$RA\text{-}RNTI=1+CEL\_id+N*(SFN/4);$$

where, CEL_id is the coverage enhancement level identity corresponding to the UE, N is a total number of the coverage enhancement levels, N≥1, and SFN is a system frame number used by the UE for transmitting the preamble.

Supplement 6

A method for determining a random access radio network temporary identity, including:
determining, by a user equipment (UE), a random access wireless network temporary identity (RA-RNTI) used by the UE, according to a coverage enhancement level identity corresponding to the UE.

Supplement 7

The method according to supplement 6, wherein the method further includes:
receiving, by the UE, configuration information broadcasted by a base station; and
determining, by the UE, available time-frequency resources to which coverage enhancement levels correspond according to the configuration information.

Supplement 8

The method according to supplement 6, wherein the method further includes:
Determining, by the UE, the coverage enhancement level to which it belongs according to a measurement result of itself.

Supplement 9

The method according to supplement 6, wherein the UE calculates the RA-RNTI used by the UE according to the coverage enhancement level identity corresponding to the UE and a time domain resource of the UE for transmitting a preamble.

Supplement 10

The method according to supplement 9, wherein the UE calculates the RA-RNTI according to a formula below:

$$RA\text{-}RNTI=1+CEL\_id+N*(SFN/4);$$

where, CEL_id is the coverage enhancement level identity corresponding to the UE, N is a total number of the coverage enhancement levels, N≥1, and SFN is a system frame number used by the UE for transmitting the preamble.

What is claimed is:

1. An apparatus for transmitting a random access response, configured in a base station, the apparatus comprising:
a memory that stores a plurality of instructions; and
processor circuitry that couples to the memory and that is configured to execute the instructions to:
determine a coverage enhancement level to which a user equipment (UE) transmitting a preamble belongs according to a position of a time-frequency resource of the detected preamble;
according to a coverage enhancement level identity corresponding to the UE, calculate a random access wireless network temporary identity (RA-RNTI) used by the UE; and
transmit a random access response (RAR) of the UE, the RAR being scrambled by the RA-RNTI of the UE.

2. The apparatus according to claim 1, wherein the processor circuitry is further configured to:
configure each coverage enhancement level in a cell with positions of available time-frequency resources; and
broadcast configuration information on the positions of the available time-frequency resources of the coverage enhancement levels.

3. The apparatus according to claim 2, wherein the number of available frequency resources of each coverage enhancement level is less than or equal to 16.

4. The apparatus according to claim 1, wherein RA-RNTIs used by UEs in different coverage enhancement levels are different, and the processor circuitry multiplexes random access responses (RARs) of the UEs in identical coverage enhancement levels to one medium access control protocol data unit (MAC PDU) for transmission by using RA-RNTIs used by UEs in identical coverage enhancement levels.

5. The apparatus according to claim 1, wherein the processor circuitry calculates the RA-RNTI used by the UE according to the coverage enhancement level identity corresponding to the UE and a time-domain resource used by the UE for transmitting the preamble.

6. The apparatus according to claim 5, wherein the processor circuitry calculates the RA-RNTI according to a formula below:

$$RA\text{-}RNTI=1+CEL\_id+N*(SFN/4);$$

where, CEL_id is the coverage enhancement level identity corresponding to the UE, N is a total number of the coverage enhancement levels, N≥1, and SFN is a system frame number used by the UE for transmitting the preamble.

7. A random access apparatus, configured in a user equipment (UE), the apparatus comprising:
a memory that stores a plurality of instructions; and
processor circuitry that couples to the memory and that is configured to execute the instructions to:
determine a coverage enhancement level to which the UE belongs according to a measurement result;
select a frequency resource from time-frequency resources to which the coverage enhancement level to which the UE belongs corresponds;

transmit a preamble by using the frequency resource selected by the processor circuitry when the UE performs a random access procedure;
calculate an RA-RNTI used by the UE according to the coverage enhancement level identity corresponding to the UE; and
descramble a PDCCH in an RAR window according to the RA-RNTI used by the UE, and obtain an RAR of the UE according to the frequency resource used by the processor circuitry for transmitting the preamble.

8. The apparatus according to claim 7, wherein the processor circuitry calculates the RA-RNTI used by the UE according to the coverage enhancement level identity corresponding to the UE and a time-domain resource used by the UE for transmitting the preamble.

9. The apparatus according to claim 8, wherein the processor circuitry calculates the RA-RNTI according to a formula below:

$$RA\text{-}RNTI = 1 + CEL\_id + N*(SFN/4);$$

where, CEL_id is the coverage enhancement level identity corresponding to the UE, N is a total number of the coverage enhancement levels, $N \geq 1$, and SFN is a system frame number used by the processor circuitry for transmitting the preamble.

10. A communication system, comprising a base station and a UE; wherein, the base station comprises the apparatus for transmitting a random access response as claimed in claim 1; and
a random access apparatus, configured in a user equipment (UE), the random access apparatus comprising:
a memory that stores a plurality of instructions; and
processor circuitry that couples to the memory and that is configured to execute the instructions to:
determine a coverage enhancement level to which the UE belongs according to a measurement result;
select a frequency resource from time-frequency resources to which the coverage enhancement level to which the UE belongs corresponds;
transmit a preamble by using the frequency resource selected by the processor circuitry when the UE performs a random access procedure;
calculate an RA-RNTI used by the UE according to the coverage enhancement level identity corresponding to the UE; and
descramble a PDCCH in an RAR window according to the RA-RNTI used by the UE, and obtain an RAR of the UE according to the frequency resource used by the processor circuitry for transmitting the preamble.

* * * * *